Feb. 24, 1925.

J. A. CADY

ANTISKIDDING TIRE CHAIN

Filed July 10, 1923

1,527,838

Inventor
James A. Cady.

By
Attorney

Patented Feb. 24, 1925.

1,527,838

UNITED STATES PATENT OFFICE.

JAMES A. CADY, OF NELSON, PENNSYLVANIA.

ANTISKIDDING TIRE CHAIN.

Application filed July 10, 1923. Serial No. 650,633.

*To all whom it may concern:*

Be it known that I, JAMES A. CADY, a citizen of the United States, residing at Nelson, in the county of Tioga and State of Pennsylvania, have invented certain new and useful Improvements in Antiskidding Tire Chains, of which the following is a specification.

This invention relates to new and useful improvements in anti-skidding tire chains, and has for its principal object to provide a tire chain in which curved metal plates with outwardly projecting cleats are substituted for the usual cross chains with a view to more effectually prevent slipping or skidding in passing over wet or uneven surfaces and with a further view of preventing the slipping of the wheels and the attendant lost motion and power in climbing hills.

With the foregoing and other objects in view that will appear as the nature of my invention is better understood the same consists in the novel features of construction, combination and arrangement of parts illustrated in the drawings and more particularly pointed out in the appended claim.

In the accompanying drawings, in which like parts are designated by like reference characters throughout the several views:—

Figure 1:
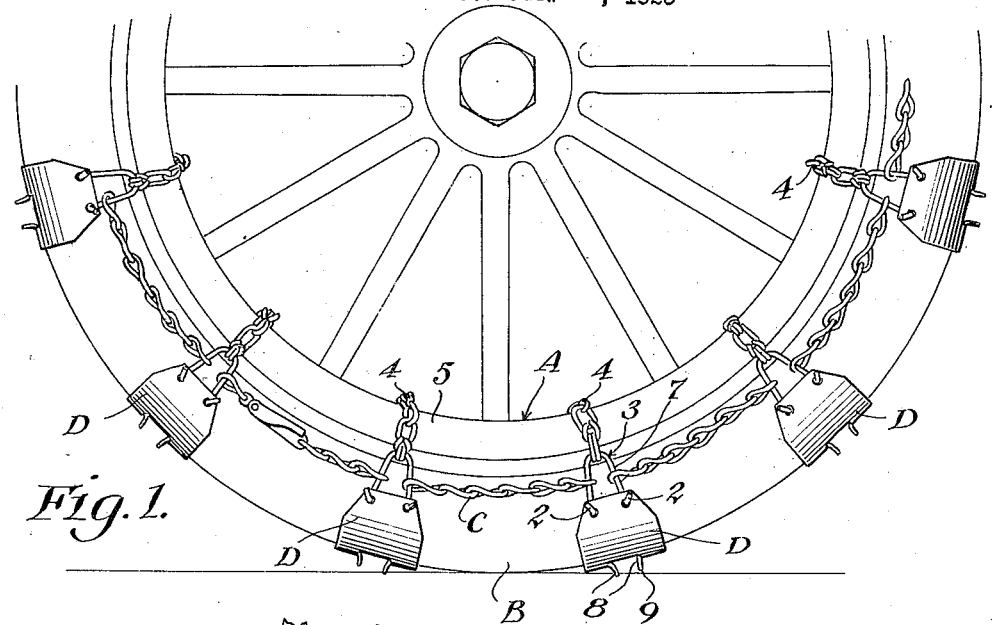
Figure 1 is a fragmentary side elevation of an automobile wheel, illustrating the application of my invention.
Figure 2:
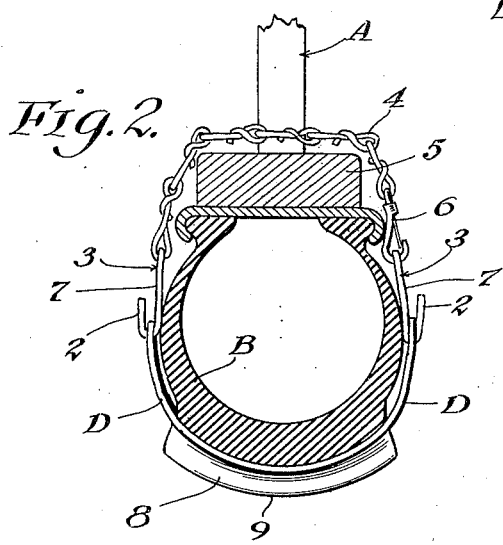
Figure 2 is a vertical transverse section.
Figure 3:
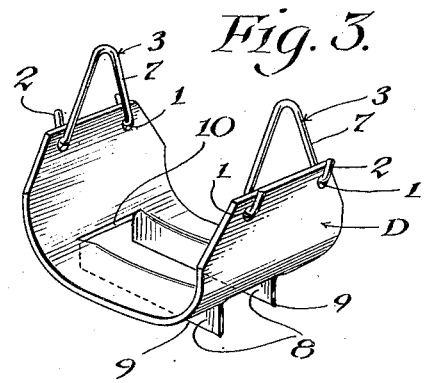
Figure 3 is a detail perspective view of one of the curved cross plates and Figure 4 a central cross sectional view thereof.
Figure 4:
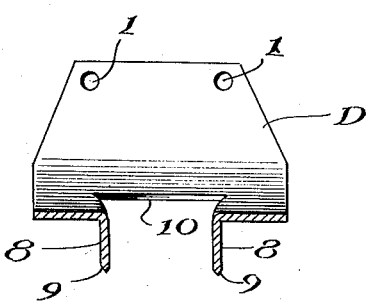

Referring to the drawings for a more particular description of my invention and in which drawings like parts are designated by like reference characters throughout the several views, A designates the wheel and B the tire. These parts may be of any ordinary or approved construction and hence, no further explanation in this regard is required. C represents the circumferential or side chains of the tire chain and D my curved metal cross plates which take the place of the usual cross chains.

The cross plates D, which are arranged at suitable spaced intervals around the circumference of the tire and fit over the outer surface or tread portion thereof, are of approximately semi-circular form on side elevation to conform to the transverse curvature of the tire and may be slightly curved transversely, if desired, to conform to the circumferential curvature of the same. Each cross plate is provided at each end, adjacent its corners, with a pair of transverse apertures or openings 1 to receive the hooks 2 formed at opposite ends of the V-shaped links 3, which, in conjunction with the corresponding cross chain 4 which passes over the inner edge of the wheel felloe 5, provide means for fastening the corresponding cross plate in place. The cross chains 4, if desired, may be provided at one end with clasps 6 to effect a detachable engagement between the cross chains and the cross plates. The several respective sections of the side chains may be connected with the side members 7 of the V-shaped links 3, as shown.

In carrying out my invention, each cross plate is provided with a pair of straight longitudinal outwardly projecting laterally spaced cleats 8 which may have sharpened outer edges 9, and which are formed by slitting the metal plate centrally and longitudinally throughout its intermediate portion and also transversely at the ends of said longitudinal slit, as at 10, and bending the resultant slit portions of the metal outwardly at right angles. These cleats will prevent slipping or skidding in passing over wet or uneven surface more effectually than the usual cross chains now in use and will also absolutely prevent slipping of the wheels and its attendant lost motion and power in climbing hills or elevations.

From the foregoing description taken in connection with the drawings, it is thought that the construction, operation and advantages of my invention will be readily understood without requiring a more extended explanation.

Having described my invention, what I claim as new and desire to secure by Letters Patent, is:—

A device of the character specified comprising curved metal cross plates arranged at spaced intervals around the circumference of the tire and provided at their ends with transverse apertures, V-shaped links formed at their ends with hooks engaging the apertured ends of said plates, cross chains passing over the wheel felloe and connected at opposite ends with said links, and side chains each comprising a plurality of circumferentially spaced sections connected at opposite ends with the side members of corresponding links.

In testimony whereof I affix my signature.

JAMES A. CADY.